United States Patent [19]
Schuster

[11] 3,947,146
[45] Mar. 30, 1976

[54] REMOVAL OF HEAT OF COMPRESSION

[75] Inventor: Robert Schuster, Munich, Germany

[73] Assignee: Linde Aktiengesellschaft, Wiesbaden, Germany

[22] Filed: Oct. 16, 1974

[21] Appl. No.: 515,312

[30] Foreign Application Priority Data
Oct. 19, 1973   Germany............................ 2352561

[52] U.S. Cl. ........................ 415/1; 415/116; 62/91; 62/305
[51] Int. Cl.² ............................................ F04D 7/00
[58] Field of Search .............. 415/1, 116; 62/305, 91

[56] References Cited
UNITED STATES PATENTS

| | | | |
|---|---|---|---|
| 1,400,813 | 12/1921 | Graemiger | 415/1 |
| 2,126,266 | 8/1938 | Laird | 62/91 |
| 2,549,819 | 4/1951 | Kane | 415/116 |
| 2,786,626 | 3/1957 | Redcay | 415/116 |

FOREIGN PATENTS OR APPLICATIONS

| | | | |
|---|---|---|---|
| 18,163 | 1904 | United Kingdom | 415/116 |
| 21,730 | 1891 | United Kingdom | 415/116 |
| 209,026 | 4/1924 | United Kingdom | 415/116 |
| 414,133 | 5/1925 | Germany | 415/116 |

*Primary Examiner*—Henry F. Raduazo
*Attorney, Agent, or Firm*—Millen, Raptes & White

[57] ABSTRACT

To reduce the pressure drop of intercoolers and final coolers in a single or multi-stage gas compression, the compressed gas is cooled in direct heat exchange with a liquid cooling medium in a spray tower, for example, instead of by indirect contact in tube-type exchangers. The process is especially amenable to the multi-stage compression of cracking gas wherein a gasoline faction is condensed out in each cooling stage and is used to supplement water as the cooling medium.

6 Claims, 1 Drawing Figure

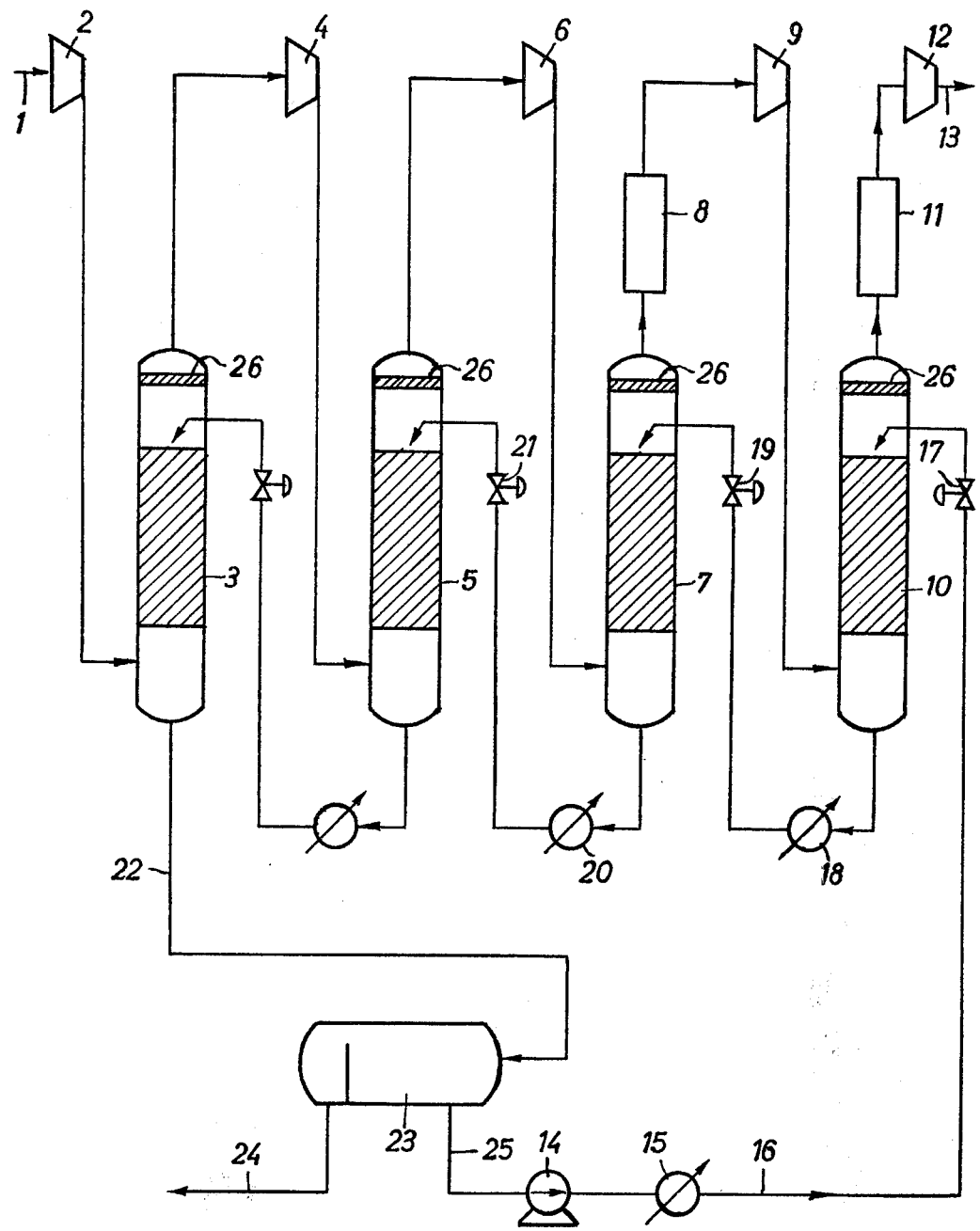

REMOVAL OF HEAT OF COMPRESSION

BACKGROUND OF THE INVENTION

This invention relates to a system for the removal of the heat of compression produced during the compression of a gas by heat exchange with a liquid cooling medium, and in particular to the cooling of a multicomponent hydrocarbon gas in a plurality of compression stages.

A process for ethylene production is known wherein a suitable starting material, for example naphtha, is cracked, the cracked gas is quenched and is subsequently subjected to a multistage compression before entering a low-temperature separation section wherein lower-boiling hydrocarbons, such as ethylene, ethane, methane, as well as hydrogen are separated by rectification. To remove the heat of compression produced in each compression stage, the cracked gas is subjected to indirect heat exchange with water in tube-type heat exchangers. The relatively high-boiling hydrocarbons which are condensed out of the cracked gas during this heat exchange, being essentially in the gasoline range, are withdrawn and can be delivered as one of the products after a further processing operation. In this conventional process, the pressure drop of the cracked gas when flowing through the individual tube-type heat exchangers is sufficiently large, and the energy requirement to compress the cracked gas so considerably increased, that this invention takes cognizance of these energy requirements and is directed to an improvement thereon.

SUMMARY OF THE INVENTION

An object of this invention is to provide an improved system (process and apparatus) in order to reduce the energy requirements in the compression of gases, especially in the multi-stage compression of cracking gases.

Upon further study of the specification and appended claims, further objects and advantages of this invention will become apparent to those skilled in the art.

To attain these objects, the heat of compression is removed by direct heat exchange of the compressed gas with the cooling medium.

It was found that when the heat of compression of a compressed gas (including one or more gaseous components) is removed by direct heat exchange with a liquid coolant, e.g. water, the resultant pressure drop during this heat exchange is far lower than when the heat of compression is removed by indirect heat exchange with water, for example in a tubular heat exchanger. Accordingly, the energy requirements for compression and subsequent cooling of a gas is considerably lower in the process of this invention than in the prior-art processes.

It is especially advantageous to subject a gas to a multistage compression, to obtain a desired final pressure, and to remove the heat of compression produced in each compression stage by direct heat exchange with the liquid cooling medium. Since also in this case, the pressure drop of the gas is relatively minor, one obtains a further advantage in addition to the saving in energy, namely a saving in initial investment costs since, with the same throughput of the gas to be treated through the individual compressor stages, the number of such compressor stages can be reduced in total as compared to the state of the art, due to the smaller pressure drop.

It is particularly economical to remove the amounts of compression heat, produced in the individual compression stages during a multistage compression, by means of a closed cooling cycle. In this case, the cooling medium is first brought into direct heat exchange with the gas obtained in the last compression stage, during which step the cooling medium is warmed. Thereupon, the thus-warmed cooling medium is re-cooled in heat exchange with a further cooling medium and then utilized for the removal of the compression heat produced in the second-to-last compression stage of the gas. This procedure is then successively repeated utnil all of the various heats of compression obtained in the individual compression stages have been removed.

The direct heat exchange between gas and cooling medium takes place advantageously in conventional spray coolers wherein the gas passes countercurrently to the liquid cooling medium. To increase the heat exchange surface area, the spray coolers can be filled with packing. In order to prevent with certainty that liquid droplets are entrained from a spray-zone cooler by the gas or gaseous mixture into the subsequent compression stage, each spary-zone cooler can be provided in its upper region with an entrainment separator or other conventional means for retaining liquid droplets.

If a gaseous mixture made up of components with differing boiling points is compressed, the higher-boiling components can be condensed during the first stage or stages of a multistage compression wherein each stage comprises compression and subsequent cooling of the gaseous mixture. Accordingly, these condensed higher-boiling components can be utilized, as a supplement to the liquid cooling medium, for the cooling and partial condensation of the gaseous mixture produced in an earlier compression stage.

The invention is particularly advantageous in the compression of a cracked gas consisting essentially of hydrocarbons with varying boiling points obtained, for example, during the cracking of naphtha. Water can be used as the cooling medium in this case.

The cracked gas obtained in the individual compression stages is advantageously cooled by means of a closed water cycle as mentioned hereinabove. The water is first warmed in the cooling stage following the last compression stage in direct heat exchange with the cracked gas, is then recooled, thereafter rewarmed in the penultimate cooling stage, and so forth, until the water has passed through all of the cooling stages. During this process, the water cycle is constantly enriched with the hydrocarbons which are condensed out in the individual cooling stages; in other words, the amount of cooling fluid available in each cooling stage is enlarged by the quantities of hydrocarbons which have already been condensed out in the cooling stages disposed downstream of this cooling stage. In this way, the amount of cooling fluid is automatically adjusted to the quantitative throughput of the cracked gas, this being a substantial advantageous effect in the heat exchange between the cracked gas and the cooling fluid.

BRIEF DESCRIPTION OF THE DRAWING

In the preferred embodiment schematically illustrated in the attached drawing, there is depicted a section of an ethylene plant relating to the multistage compression and the removal of the compression heat obtained in each compression stage, according to this invention, from a cracked gas (derived from a cracking furnace not shown) which has already been quenched and has partially been freed in a primary column from high-boiling hydrocarbons, such as pyrolysis oil, for example.

DETAILED DESCRIPTION OF THE DRAWING

According to the drawing, the cracked gas enters the first compressor 2 via conduit 1 under a pressure of about 1.1 atmospheres absolute and is compressed therein to about 1.9 atm. abs. During this compression step, the cracked gas is heated to about 90°C., i.e. a temperature just sufficient to prevent the formation of undesired polymers. Thereafter, the cracked gas is cooled to about 30° C. in the spray cooler 3 which, as in the case of other spray coolers, can be filled with packing, and is then compressed in a second compression stage in compressor 4 to about 4.3 atm. abs. The removal of the compression heat produced in compressor 4, i.e. the recooling of the cracked gas to about 30° C., takes place in the spray cooler 5. Thereupon, the cracked gas is compressed in compressor 6 to about 9 atm. abs., recooled in spray-zone cooler 7 to about 30° C., and subjected to an alkazid (removal of $SO_2$ by absorption in cold α-aminopropionic acid) scrubbing step in scrubber 8. Further compression to about 17.4 atm. abs. occurs in the compressor 9, and the cracked gas is then recooled in the spray-zone cooler 10 to about 30° C. The cracked gas leaving the spray-zone cooler 10 is subjected to a glycol drying step in the apparatus 11 and thereupon compressed in compressor 12 to the required final pressure of about 33 atm. abs. Under this pressure, the cracked gas is fed via conduit 13 to a low-temperature separation section, not shown herein, where it is separated by conventional technology into its components, i.e. primarily hydrogen, methane, ethane, and ethylene.

To cool the cracked gas in the spray-zone coolers 10, 7, 5 and 3, a closed water cycle is provided:

The water is first pumped to a pressure of about 19 atm. abs. by means of the pump 14. It is then passed through the cooler 15 where it is cooled to about 30° C. in heat exchange with water, and then it is passed via conduit 16 into the spray cooler 10, after having been expanded in valve 17 for further cooling. In the spray cooler 10, the water is warmed to about 55° C. in direct heat exchange with the cracked gas entering from compressor 9. During the course of this heat exchange, a portion of the higher-boiling hydrocarbons within about the gasoline range, is condensed out of the cracked gas. Together with the thus-condensed hydrocarbons, the water is cooled in the water cooler 18 to about 30° C. and thereupon fed, via the expansion valve 19, to the spray cooler 7 wherein it is warmed, together with the condensate from cooler 10, to about 55° C. in direct heat exchange with partially condensing cracked gas from compressor 6. Thereafter, the water is recooled to about 30° C. in the water cooler 20 together with the hydrocarbons from cooler 10 and with the hydrocarbons which are condensed out in the cooler 7 and are likewise in the gasoline range; via the valve 21, the water is then expanded into the spray cooler 5 wherein the cracked gas obtained from the compressor 4 is cooled and partially condensed. The same procedure is repeated in the spray cooler 3 from which finally a liquid mixture consisting of water and the hydrocarbons obtained in the coolers 10, 7, 5, and 3 is withdrawn via conduit 22 under a temperature of about 55° C. The hydrocarbons are separated from the water in the separating tank 23 and withdrawn via conduit 24 for further processing, whereas the water is recycled by way of conduit 25.

In order to prevent droplets of liquid from being entrained from the spray coolers and passed into the compressors connected thereafter, the coolers are provided with entrainment separators 26 in their to zones. top is preferred to employ a low pressure drop entrainment separator of the type of a laminated separator, i.e. a separator with a laminated structure of thin sheets of metal each having the function of a reflecting plate.

It is also preferred to use a low pressure drop type of packing of the type of Raschig rings.

It has been found that the pressure loss of the cracked gas can be considerably reduced by the use of spray coolers for removing the heat of compression of the cracked gas, i.e. by direct heat exchange between the cracked gas and the cooling medium. Whereas the pressure drop of the cracked gas when passing through a heat exchanger is about 0.7 atm. abs. according to the state of the art, i.e. with the use of tubular heat exchangers, the pressure drop is reduced to approximately 0.2 atm. abs. in accordance with the process of the present invention, with the same throughput, all other things being equal. Accordingly, the process of this invention provides, as compared to the prior art, a considerable saving in energy, as well as a substantial saving in initial investment costs, since it is now possible to reduce the total compressor capacity to attain the desired final pressure.

In addition to packed column spray towers there can be employed for example cyclone spray towers, venturi and jet scrubbers as well as wetted wall columns, at which the latter is accomplished with the least pressure drop.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process which comprises compressing a gas in a plurality of compression stages, after each compression stage cooling the compressed gas by direct contact with a liquid cooling medium and removing resultant warmed liquid from said gas, the improvement comprising the steps of providing a closed liquid cooling medium cycle, pressurizing the liquid cooling medium and injecting the same into direct heat exchange with the gas compressed from the last pressure stage of the plurality of stages, the thus-warmed liquid cooling medium then being withdrawn and cooled by indirect heat exchange, the resultant recooled liquid cooling medium being thereafter injected into the gas compressed by the stage preceding the last pressure stage, and when more than two compression stages are employed in said plurality of compression stages, repeating the aforesaid steps until the heat of compression produced resulting from the first compression stage of the gas has been transferred to the liquid cooling medium in direct heat exchange contact, and pressurizing said liquid cooling medium and cooling the same by indirect heat exchange and recycling the resultant cooled pressurized liquid cooling medium into direct heat exchange contact with the gas of the last compression stage.

2. A process according to claim 1, wherein said gas is a mixture of hydrocarbons boiling at different temperatures, and the liquid cooling medium comprises water.

3. A process according to claim 2, wherein a portion of hydrocarbon is condensed during at least one of the indirect heat exchange steps between two compression stages, said condensed portion is separated from the compressed gas; said separated condensed portion is employed in addition to said water as said liquid cooling medium.

4. A process according to claim 3, wherein said direct heat exchange is conducted in a plurality of spray towers.

5. A process according to claim 1, wherein direct heat exchange is conducted in a plurality of spray towers.

6. A process according to claim 4, wherein said condensed portions of hydrocarbon boil in the range of gasoline.

* * * * *